United States Patent
Kinoshita

(10) Patent No.: US 8,456,055 B2
(45) Date of Patent: Jun. 4, 2013

(54) CORE BLOCK, AND MAGNETIC POLE CORE USING CORE BLOCKS FOR MOTOR

(75) Inventor: Nobuo Kinoshita, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 447 days.

(21) Appl. No.: 12/722,802

(22) Filed: Mar. 12, 2010

(65) Prior Publication Data
US 2010/0231084 A1    Sep. 16, 2010

(30) Foreign Application Priority Data
Mar. 13, 2009   (JP) .................................. 2009-060910

(51) Int. Cl.
*H02K 1/06*        (2006.01)

(52) U.S. Cl.
USPC ............................. 310/216.009; 310/216.008

(58) Field of Classification Search
USPC ..................... 310/216.001–216.133
See application file for complete search history.

(56) References Cited

U.S. PATENT DOCUMENTS

| | | | |
|---|---|---|---|
| 6,226,856 B1 | 5/2001 | Kazama et al. | |
| 6,369,687 B1 | 4/2002 | Akita et al. | |
| 6,946,769 B2 * | 9/2005 | Yamamura et al. | .... 310/216.015 |
| 8,102,092 B2 * | 1/2012 | Tomohara et al. | ..... 310/216.008 |
| 2009/0026873 A1 * | 1/2009 | Matsuo et al. | ................ 310/216 |

FOREIGN PATENT DOCUMENTS

| | | |
|---|---|---|
| CN | 1178410 A | 4/1998 |
| JP | 10-210699 | 8/1998 |
| JP | 11-008958 | 1/1999 |
| JP | 2000-201458 | 7/2000 |
| JP | 2006-304495 | 11/2006 |
| JP | 2007-028853 | 2/2007 |
| TW | 454372 B | 9/2001 |

* cited by examiner

*Primary Examiner* — Nguyen N. Hanh
(74) *Attorney, Agent, or Firm* — McGlew and Tuttle, P.C.

(57) ABSTRACT

A core block has an arm portion, and a yoke portion extending circumferentially at an end of the arm portion. At least the yoke portion is configured such that a plurality of core segments are stacked in multiple levels in an axial or radial direction. Each of the core blocks has engaging portions formed at respective opposite ends of the yoke portion and adapted to connect adjacent core blocks. In a first-level core segment, each of the engaging portions has a protrusion extending circumferentially from a corresponding one of the opposite ends of the yoke portion, and a recess juxtaposed radially to the protrusion and adapted to receive the protrusion of an adjacent core block. In a second-level core segment, each of the engaging portions has the protrusion and the recess provided in positionally reversed relation with those of the first-level core segment with respect to the radial direction.

2 Claims, 15 Drawing Sheets

CORE BLOCK

SECOND-LEVEL CORE SEGMENT

FIRST-LEVEL CORE SEGMENT

SECOND-LEVEL CORE SEGMENT

FIRST-LEVEL CORE SEGMENT

YOKE PORTION

ARM PORTION

STEP

STEP

ENGAGING PORTION

ENGAGING PORTION

FIG. 3A
SECOND-LEVEL CORE SEGMENT
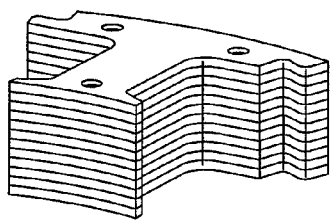
FIG. 3B
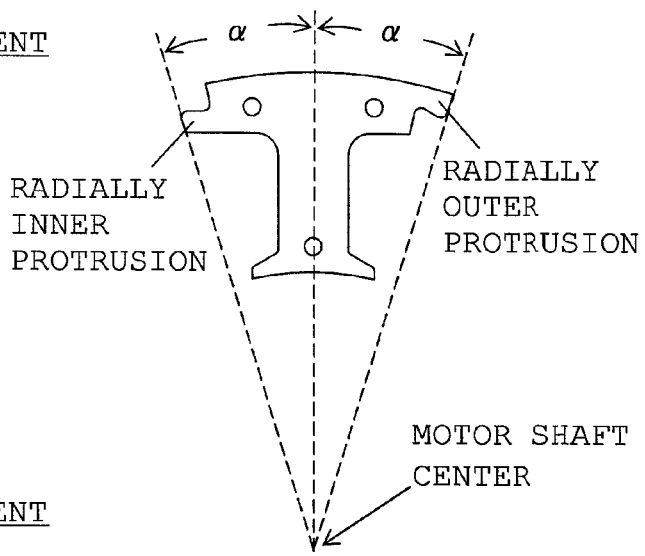
FIG. 3C
FIRST-LEVEL CORE SEGMENT
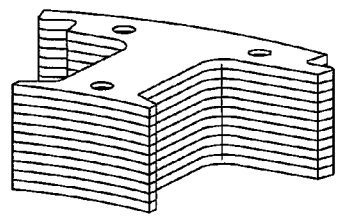
FIG. 3D
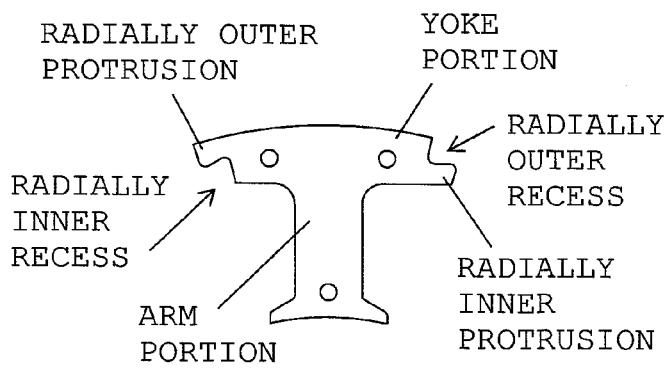
FIG. 3E
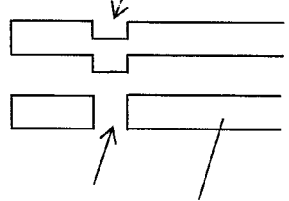
FIG. 3F

SECOND-LEVEL CORE SEGMENT

FIRST-LEVEL CORE SEGMENT

SAME LINE

SECOND-LEVEL CORE SEGMENT

FIRST-LEVEL CORE SEGMENT

SAME LINE

YOKE PORTION  ARM PORTION

ENGAGING PORTION

ENGAGING PORTION

MINOR PROTRUSION

SECOND-LEVEL CORE SEGMENT

RADIALLY OUTER PROTRUSION
RADIALLY INNER PROTRUSION
MINOR PROTRUSION
RADIALLY INNER RECESS

FIRST-LEVEL CORE SEGMENT

RADIALLY INNER PROTRUSION
RADIALLY OUTER PROTRUSION
RADIALLY INNER RECESS
MINOR PROTRUSION

MINOR PROTRUSION

FOURTH-LEVEL CORE SEGMENT
THIRD-LEVEL CORE SEGMENT
SECOND-LEVEL CORE SEGMENT
FIRST-LEVEL CORE SEGMENT

THIRD-LEVEL CORE SEGMENT
SECOND-LEVEL CORE SEGMENT
FIRST-LEVEL CORE SEGMENT

TYPE A

TYPE B

CORE BLOCK

SECOND-LEVEL CORE SEGMENT

FIRST-LEVEL CORE SEGMENT

ARM PORTION

YOKE PORTION

ENGAGING PORTION

ENGAGING PORTION

FIG. 14
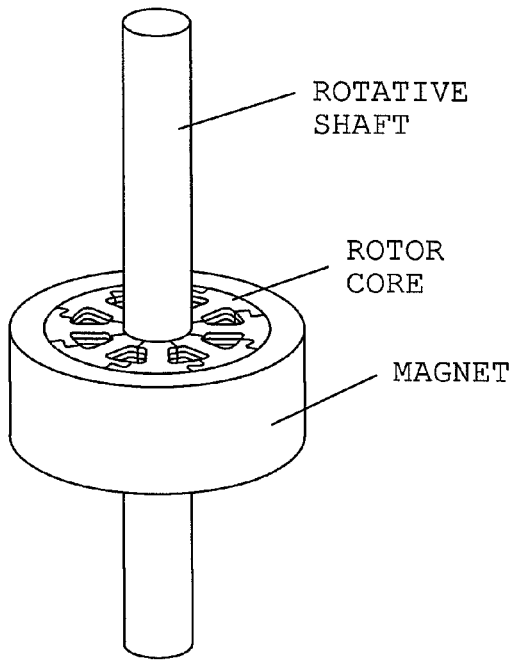
FIG. 15A
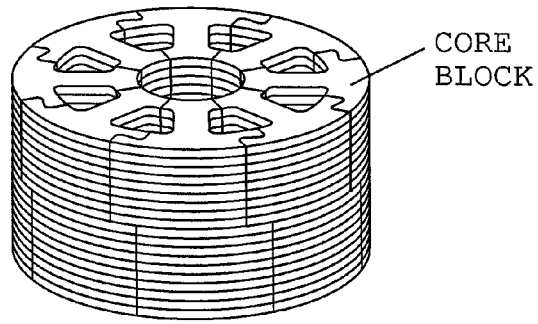
FIG. 15B  FIG. 15C  FIG. 15D  FIG. 15E
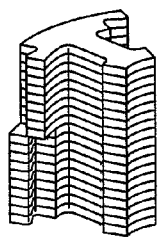 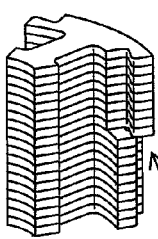 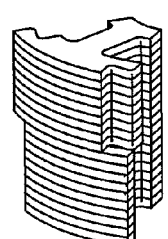 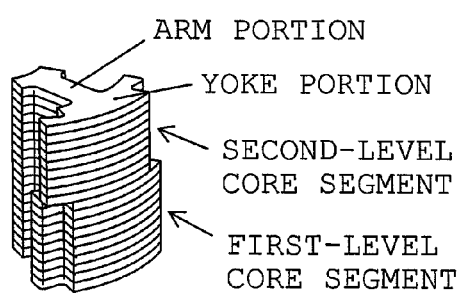

FIG. 16A
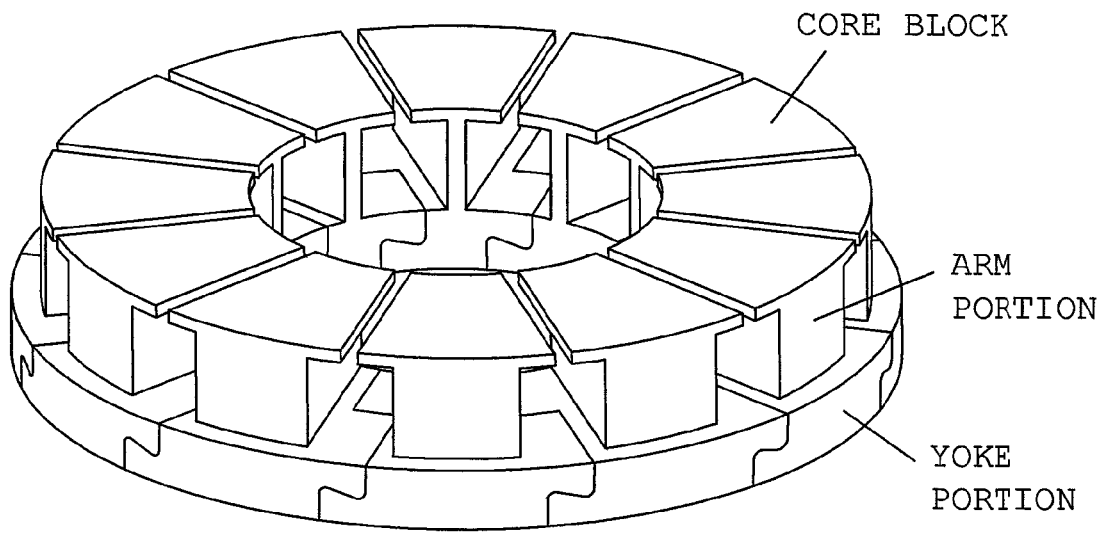
FIG. 16B  FIG. 16C
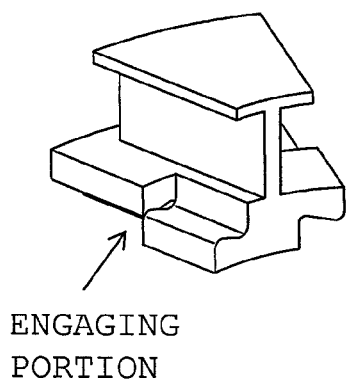 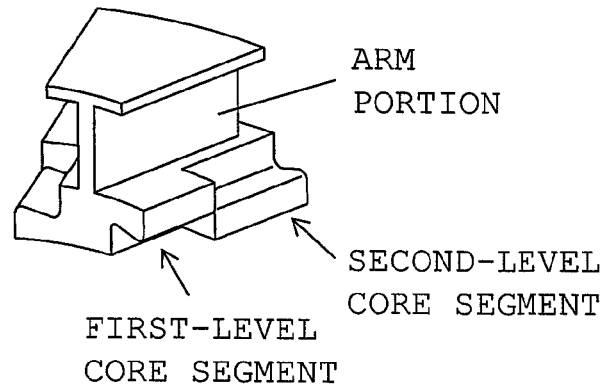
FIG. 16D  FIG. 16E
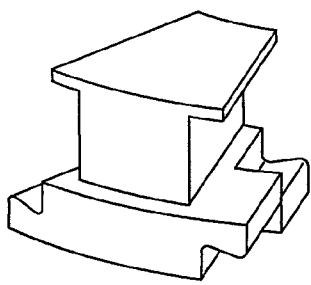 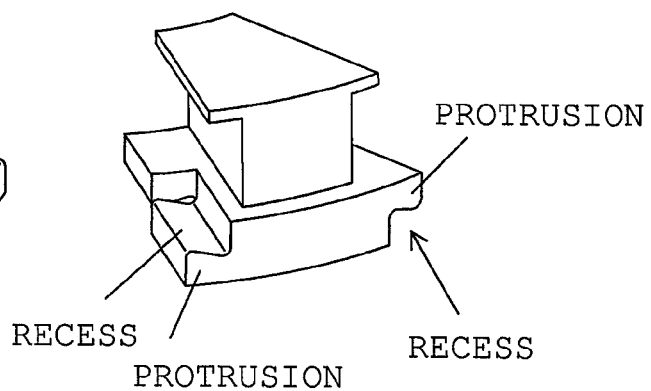

ROTATIVE SHAFT

ROTOR CORE

YOKE PORTION

ARM PORTION

ARM PORTION

ENGAGING PORTION

ENGAGING PORTION

YOKE PORTION

CORE BLOCK, AND MAGNETIC POLE CORE USING CORE BLOCKS FOR MOTOR

This application claims the benefit of Japanese Patent Application No. 2009-060910, filed Mar. 13, 2009 in Japan, the disclosures of which are incorporated herein by reference.

BACKGROUND OF THE INVENTION

1. Field of the Invention

The present invention relates to a core block used in a number greater than one to configure a single annular magnetic pole core (yoke) through mutual connection of core blocks and to a magnetic pole core for a motor configured through annular integration of the core blocks.

2. Description of the Related Art

In, for example, an inner rotor brushless motor used to drive a motor-driven tool, a sensor for detecting position is attached to a stator and detects a magnetic pole of a magnet provided on a rotor, thereby performing switching control of current to be applied to the stator winding. The stator core of such a brushless motor is configured such that slots between magnetic poles for accommodating windings are opened radially inward. Such a configuration encounters difficulty in winding by use of a winding machine. Specifically, such a winding machine performs winding in such a manner that, while a workpiece is fixed, a winding nozzle is moved along a rectangular or elliptic orbit. Accordingly, the width of a slot between magnetic poles imposes limitation on a usable nozzle diameter or wire diameter. Also, since a space for allowing the passage of the winding nozzle must be provided within a spatial range for winding, difficulty is encountered in increasing the space factor of winding. Inevitably, improvement in motor performance is hindered. Further, the utilization of material for steel laminations used to form a magnetic pole core is lowered.

A known technique for solving such a winding problem is as follows: laminates of core pieces are connected to one another in an articulated structure, which allows bending, and undergo winding in a spread condition; after winding, the laminates are formed into an annular stator core (refer to, for example, Japanese Patent Application Laid-Open (kokai) No. 2000-201458). FIGS. 18A and 18B show the conventional stator core of the articulated structure described in Japanese Patent Application Laid-Open (kokai) No. 2000-201458. FIG. 18A is a plan view showing a step of forming first and second core members by a stamping process. FIG. 18B is a plan view showing a state in which the first and second core members are laminated alternatingly. Each of the first and second core members is composed of a plurality of core pieces connected continuously by connection means (sets each consisting of a convex portion and a concave portion). Opposite ends of each core piece are formed into a convexly arcuate shape or a concavely arcuate shape, respectively. The core pieces of the first core member and the second core member are formed such that one end of each of the core pieces of the first core member is formed into a convexly arcuate shape, and the corresponding end of each of the core pieces of the second core member is formed into a concavely arcuate shape. The thus-formed first and second core members are laminated. The connection means of convex end portions of the core pieces of the first core members and the corresponding connection means of convex end portions of the core pieces of the second core members are engaged with one another, whereby the laminates of the core pieces are connected rotatably. In a state shown in FIG. 18B, winding is performed (not shown) on the arm portions. Subsequently, the laminates of the core pieces are rotated about the engaged connection means so as to form an annular shape. The articulated stator core is thus completed.

Such an articulated stator core has an articulated structure, which allows repeated bending, and enables winding in such a state where the arm portions are caused to project outward one by one. However, in the case of a small-sized motor, forming an articulated structure is difficult or impossible.

Meanwhile, in the case of a split core which does not have connection means employed in the above-mentioned articulated structure, core blocks undergo insulation treatment, followed by winding. Then, the core blocks are assembled together into an annular shape, thereby completing a stator core. In contrast to the above-mentioned winding method in which, while a workpiece is fixed, a winding nozzle is moved along a rectangular or elliptic orbit, the simple split core enables the employment of a winding method in which, while a winding nozzle is fixed, a workpiece is moved. Thus, a thick wire can be readily wound. In this manner, in the case of a simple split core, the core blocks can be handled individually; therefore, winding with high space factor is possible. However, in a process of assembling the core blocks into an annular shape subsequent to a winding process and in a process of inserting the core blocks assembled in an annular shape into a housing, no means is available for maintaining the connected core blocks in an annular shape. Even when jigs are available for such processes, a large number of man-hours are involved. In order to maintain the annular shape without need to use jigs, the core blocks must be fixedly connected by, for example, welding or bonding.

Japanese Patent Application Laid-Open (kokai) No. 2006-304495 discloses a structure which facilitates the connection and fixation of such core blocks. FIG. 19 is a view showing how the core blocks are connected to one another in a fixed condition according to the method disclosed in the publication. The core blocks undergo insulation treatment, followed by intensive winding. The core blocks which have undergone winding are arranged annularly. Then, while adjacent connecting portions are connected, the connected connecting portions are bonded together by use of adhesive. Each of the connecting portions has a shape resembling the letter N, for allowing the adjacent connecting portions to mate with each other.

However, in a state in which such core blocks are assembled without use of, for example, adhesive, the movement of the individual core blocks is restricted, at each connection portion, only in the circumferential direction and unidirectionally with respect to the radial direction. In order to restrict the movement of the individual core blocks bidirectionally with respect to the radial direction and in the axial direction of a motor for retaining the annularly assembled condition, the core blocks must be joined by, for example, bonding or welding. That is, such a split core involves a problem in that the core blocks assembled without use of adhesive or any other joining means are easily separated from one another.

A similar problem is also involved in a stator core of an outer-rotor-type brushless motor (refer to, for example, Japanese Patent No. 3261074 and Japanese Patent Application Laid-Open (kokai) No. H10-210699) and in a stator core of an axial-gap-type brushless motor (refer to, for example, Japanese Patent Application Laid-Open (kokai) No. 2007-028853). Slots between magnetic poles for winding are opened radially outward in the stator core of the outer-rotor-type brushless motor and are opened in the axial direction of a rotational shaft in the stator core of the axial-gap-type brushless motor. Accordingly, as compared with the above-mentioned stator core of an inner rotor brushless motor, not much difficulty is encountered in winding. However, the employment of a split core greatly facilitates winding. Further, the employment of a split core improves the utilization of material in stamping out blanks of a predetermined shape from a steel sheet. As is well known, a magnetic pole core is usually formed by laminating steel sheet blanks of a predetermined shape stamped from a steel sheet. Stamping out an annular piece having the shape of a magnetic pole core leaves a useless central piece having a large area. By contrast, stamping out core pieces of a split core does not involve such useless sheet pieces, thereby improving the utilization of material. From this point of view, even in formation of a magnet rotor core, which does not require winding, stamping out core pieces of a split core improves the utilization of material. However, as mentioned above, core blocks which are merely assembled together are readily separated from one another.

SUMMARY OF THE INVENTION

An object of the present invention is to solve a characteristic problem of a split core; i.e., the requirement of fixation of core blocks of the split core, for employing a split core configuration, which facilitates winding and improves the utilization of material as compared with a unitary core. Another object of the present invention is to restrict a bidirectional movement of the assembled core blocks with respect to a circumferential direction, a radial direction, and a motor's axial direction merely through simple engagement of adjacent core blocks and to enable the insertion, into a motor housing, of the assembled core blocks without need to fixedly join adjacent core blocks by, for example, welding or bonding.

A core block of the present invention is used in a number greater than one to configure a single annular magnetic pole core. The core blocks are arranged in a circumferential direction and engaged with one another at opposite ends thereof. The core block comprises a plurality of core segments stacked in multiple levels. Each of the core segments has an asymmetric planar shape and has engaging portions at respective opposite ends thereof. The core block has a latch surface for restricting a bidirectional movement of engaged adjacent core blocks with respect to an axial direction, a radial direction, and a circumferential direction.

Each of the core segments stacked in multiple levels has an arm portion, and a yoke portion extending in the circumferential direction at an end of the arm portion. The latch surface is defined by a protrusion and a recess which are provided adjacent to each other at each of opposite ends of the yoke portion. In at least one of the core segments stacked in multiple levels, the protrusions protrude in the circumferential direction from the respective opposite ends of the yoke portion, and the recesses are configured to receive the respective protrusions of adjacent core bocks. In at least another one of the core segments stacked in multiple levels, the protrusions and the respective recesses are provided adjacent to each other in positionally reversed relation with those of the one of the core segments. Each of the protrusions has an engaging convexity which is formed at a distal end portion of the protrusion through increase in thickness of the distal end portion as compared with a root portion of the protrusion, thereby forming, on a side toward the root portion, an engaging concavity with which the engaging convexity of an adjacent core block is engaged.

A magnetic pole core for a motor of the present invention comprises a plurality of core blocks united annularly. Each of the core blocks has an arm portion, and a yoke portion extending in a circumferential direction at an end of the arm portion. At least the yoke portion is configured such that a plurality of core segments are stacked in multiple levels in an axial direction of a rotative shaft of the motor or in a radial direction. Each of the core blocks has engaging portions formed at respective opposite ends of the yoke portion and adapted to connect the core block to adjacent core blocks. In at least one of the core segments stacked in multiple levels, each of the engaging portions has a protrusion extending in the circumferential direction from a corresponding one of the opposite ends of the yoke portion, and a recess juxtaposed to the protrusion in the radial direction or the axial direction and adapted to receive the protrusion of an adjacent core block. In at least another one of the core segments stacked in multiple levels, each of the engaging portions has the protrusion and the recess provided in positionally reversed relation with those of the one of the core segments with respect to the radial direction or the axial direction.

In the magnetic pole core for a motor of the present invention, each of the core blocks is configured such that a plurality of unit core blocks are connected in a circumferential direction. Each of the unit core blocks has an arm portion, and a yoke portion extending in the circumferential direction at an end of the arm portion. At least the yoke portion is configured such that a plurality of core segments are stacked in multiple levels in an axial direction of a rotative shaft of the motor or in a radial direction. Each of the core blocks has engaging portions formed at respective outer ends of the yoke portions located at opposite sides of the core block and adapted to connect the core block to adjacent core blocks. In at least one of the core segments stacked in multiple levels, each of the engaging portions has a protrusion extending in the circumferential direction from a corresponding one of the outer ends of the yoke portions, and a recess juxtaposed to the protrusion in the radial direction or the axial direction and adapted to receive the protrusion of an adjacent core block. In at least another one of the core segments stacked in multiple levels, each of the engaging portions has the protrusion and the recess provided in positionally reversed relation with those of the one of the core segments with respect to the radial direction or the axial direction.

The present invention employs a split core configuration, which enables the winding of a thick wire and winding with high space factor and enables the manufacture of a high-performance motor. Additionally, according to the present invention, assembled core blocks can be fixed bidirectionally with respect to the circumferential direction, the radial direction, and the motor's axial direction merely through simple engagement of adjacent core blocks. The assembled core blocks can be inserted into a motor housing without need to fixedly join adjacent core blocks by, for example, welding or bonding. Also, according to the present invention, a connection structure for adjacent core blocks is simple. Thus, the present invention can be applied to a small-sized motor.

BRIEF DESCRIPTION OF THE DRAWINGS

FIGS. 3A and 3B are views for explaining the stacking of a first-level core segment and a second-level core segment, wherein FIG. 3A is a perspective view of the second-level core segment, and FIG. 3B is a plan view of the second-level core segment;

FIGS. 3C and 3D are a perspective view and a plan view, respectively, showing the first-level core segment;

FIG. 3E is a perspective view showing the first-level core segment and the second-level core segment in a stacked condition;

FIG. 3F is a view for explaining the fixation of laminated core sheets;

FIGS. 5A and 5B are views showing a state in which adjacent core blocks are engaged, wherein FIG. 5A is a view for explaining the engagement of the second-level core segments, and FIG. 5B is a view for explaining the engagement of the first-level core segments;

FIGS. 7A and 7B are views for explaining the shape of engaging portions of the stator core of the second embodiment, wherein FIG. 7A is a view showing the planar shape of a second-level core segment, and FIG. 7B is a view showing the planar shape of core blocks engaged together;

FIGS. 12A and 12B are views showing core blocks of different types of a stator core according to a seventh embodiment of the present invention, wherein FIG. 12A is a perspective view showing a core block of type A, and FIG. 12B is a perspective view showing a core block of type B;

FIG. 14 is a perspective view showing a state in which a rotor core of a split configuration capable of being used in an inner-rotor brushless DC motor is mounted on a rotative shaft;

FIG. 15A is a perspective view showing the entire rotor core;

FIGS. 15B to 15E are perspective views showing a single core block of the rotor core of FIG. 15A as viewed from different directions;

FIG. 16A is a perspective view showing a stator core capable of being used in an axial-gap brushless DC motor;

FIGS. 16B to 16E are perspective views showing a single core block of the stator core of FIG. 16A as viewed from different directions;

DETAILED DESCRIPTION OF THE PREFERRED EMBODIMENTS

Figure 1:
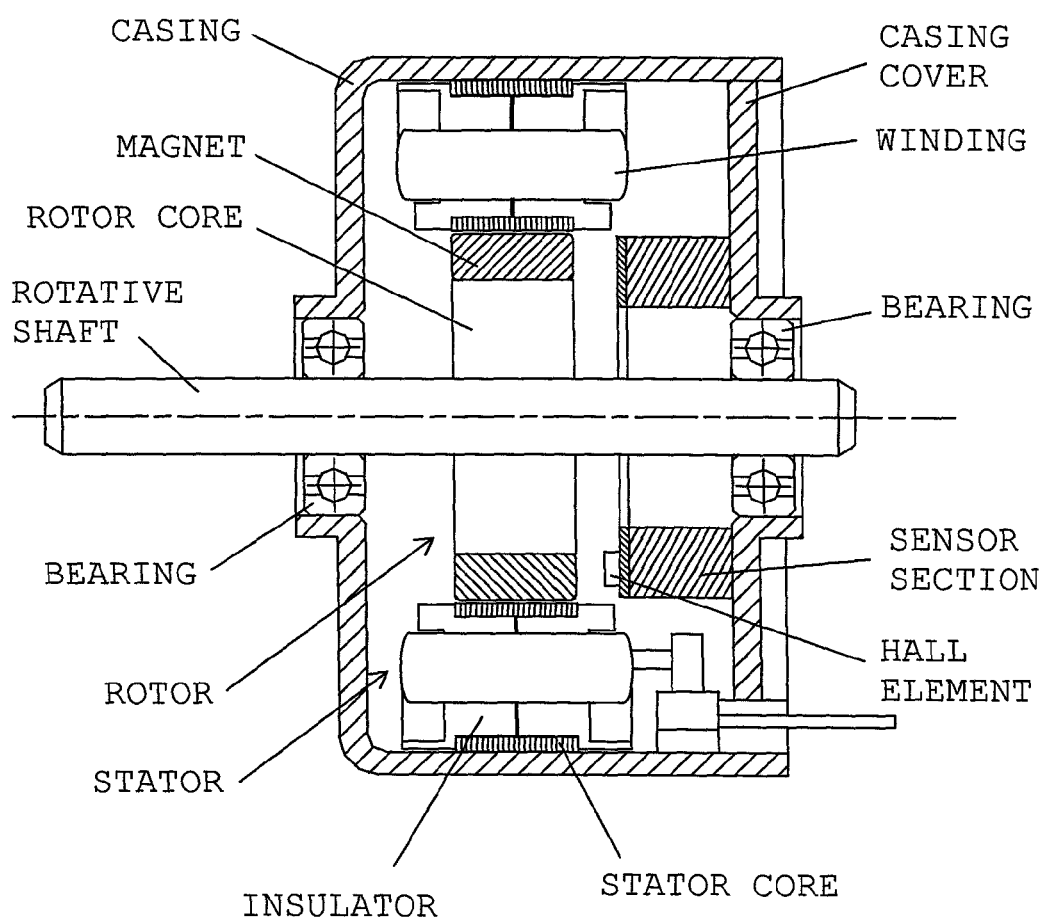
FIG. 1 is a sectional view showing the entire configuration of an inner-rotor brushless DC motor to which the present invention can be applied.

Embodiments of the present invention will next be described with reference to the drawings. FIG. 1 is a sectional view showing the overall configuration of an inner rotor brushless DC motor to which the present invention can be applied. A motor housing includes a closed-bottomed cylindrical casing formed from metal or resin, and a casing cover formed from metal or resin. The casing cover is fitted into the inner circumference of an opening portion of the casing. As will be described in detail later, a stator is fixed on the inner wall surface of the cylindrical casing. The stator is configured such that winding is wound on a stator core (yoke to configure a magnetic circuit) of a split configuration via an insulator. The motor housing composed of the casing and the casing cover, and the stator fixed in the motor housing constitute a motor stator (armature). A bottom portion of the casing, and the casing cover have respective bearings fixed at the respective centers. The bearings support a rotative shaft of a rotor. One or both of the opposite ends of the rotative shaft project to the exterior of the motor housing and are coupled with an external apparatus for driving the apparatus.

A plurality of magnets which serve as rotor poles are mounted on a rotor core (rotor yoke) fixed on the rotative shaft and face the stator core. As will be described in detail later with reference to FIGS. 14 and 15, the rotor core may also be of a split core configuration. For example, a cylindrically formed neodymium plastic magnet may be used as an assembly of the rotor magnets. A sensor section is disposed on the motor stator side so as to detect a rotational position of the rotor through utilization of the rotor magnets provided on the surface of the rotor. The sensor section has a magnetic-flux detection element, such as a Hall element, for detecting the magnetic flux generated by the rotor magnets.

Figure 2A:
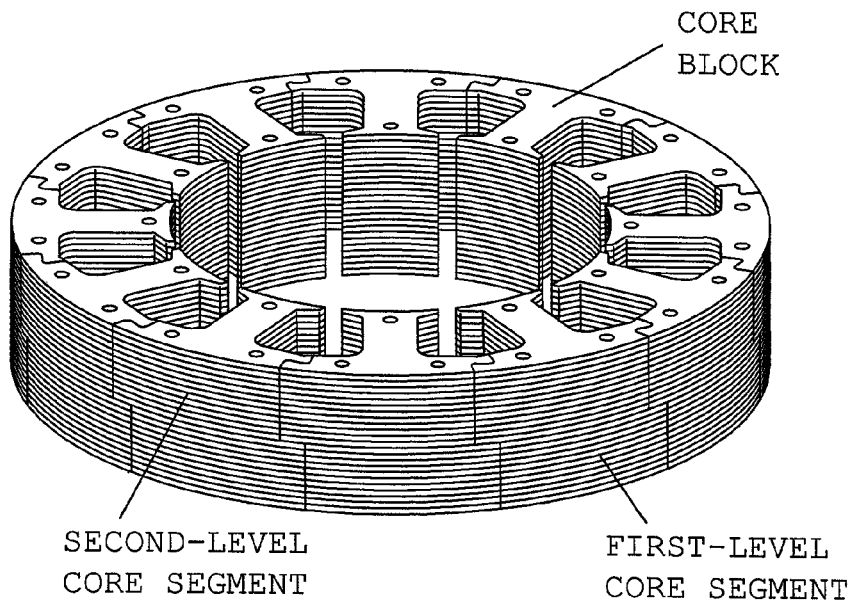
FIG. 2A is a perspective view of a stator core according to a first embodiment of the present invention employed in the motor of FIG. 1, showing an assembly of core blocks.
Figure 2B:
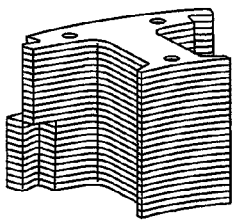
FIGS. 2B to 2E are perspective views of a single core block as viewed from different directions.
Figure 2C:
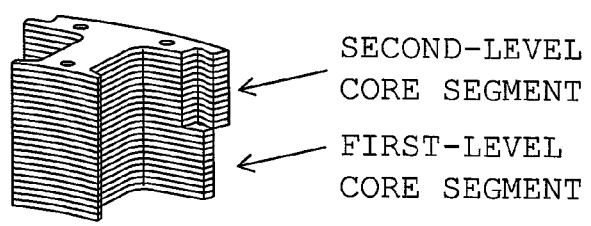
Figure 2D:
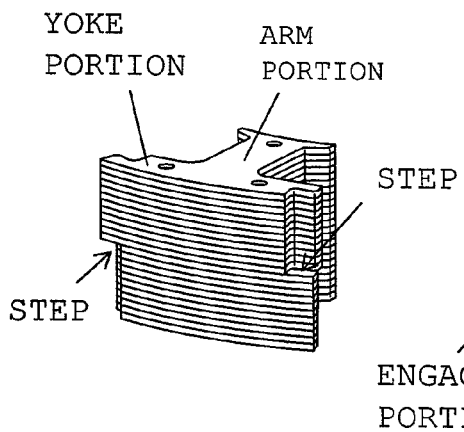
Figure 2E:
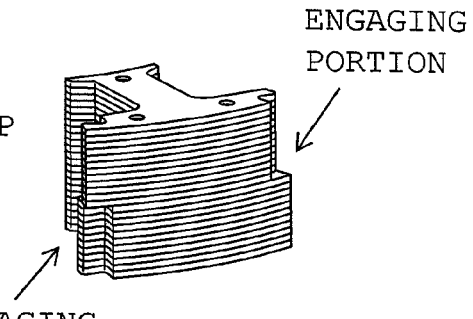

FIGS. 2A to 2E are views showing a stator core according to a first embodiment of the present invention employed in the motor of FIG. 1. FIG. 2A is a perspective view showing an assembly of core blocks. FIGS. 2B to 2E are perspective views of a single core block as viewed from different directions. In actual practice, winding is performed on the individual core blocks which have undergone insulation treatment; then, the core blocks are fixedly joined together. However, for convenience of explanation, in FIG. 2 and the drawings appearing in the following description, the illustration of insulation treatment and winding is omitted. The insulation treatment and winding can be performed by use of known techniques.

The illustrated stator core is an assembly of 12 core blocks (12 poles) of the same shape. Each of the core blocks is configured such that core segments are stacked in two levels in the axial direction of the rotative shaft. A first-level core segment and a second-level core segment do not necessarily have the same length (the same number of laminated core sheets) along the axial direction of the rotative shaft. In the case of the same length, the first-level core segment and the second-level core segment have the same shape while being disposed in inverted relation with each other. Notably, a magnetic pole core segment is usually configured such that blanks of a predetermined shape stamped from a steel sheet are laminated; however, the magnetic pole core segment may assume the form of a solid body formed by use of a compact of a magnetic material powder.

Each of the core blocks has an arm portion, and an arcuate yoke portion extending bidirectionally along a circumferential direction at a radially outer end of the arm portion. Winding is performed on the arm portion after insulating treatment. When the core blocks are assembled annularly, the yoke portions are annularly connected to one another via engaging portions formed at the opposite ends of the individual yoke portions. On each of circumferentially opposite sides of the core block, a step is formed between corresponding engaging portions of the first- and second-level core segments. Respective shoulder surfaces of the steps formed on the opposite sides of the core block face opposite directions. Since the core blocks are annularly connected to one another, the surfaces of the steps serve as latch surfaces. Thus, the movement of the core blocks is restricted bidirectionally with respect to the axial direction of the rotative shaft.

FIGS. 3A to 3F are views for explaining the stacking of the first-level core segment and the second-level core segment. FIGS. 3A and 3B are a perspective view and a plan view, respectively, showing the second-level core segment. FIGS. 3C and 3D are a perspective view and a plan view, respectively, showing the first-level core segment. FIG. 3E is a perspective view showing the first-level core segment and the second-level core segment in a stacked condition. FIG. 3F is a view for explaining the fixation of laminated core sheets. The yoke portion including the engaging portions of the first-level core segment and the yoke portion including the engaging portions of the second-level core segment have the same shape while being disposed in laterally inverted relation with each other. In the present first embodiment, the planar shape of at least the yoke portion of a core segment is asymmetric and, as shown in FIG. 3B, falls within an annular range consisting of two same central angles ($\alpha$). Notably, the first-level core segment and the second-level $\alpha$core segment do not necessarily differ from each other in the shape of the arm portion. As illustrated, a radially outer protrusion, a radially inner protrusion, a radially outer recess, and a radially inner recess, which will be described in detail later, constitute the engaging portions adapted to fixedly connect core blocks; specifically, the radially outer protrusion and the radially inner protrusion of one core block are engaged with the radially outer recess of another core block and the radially inner recess of still another core block, respectively. The radially outer protrusion and the radially inner recess are juxtaposed to each other in the radial direction at one end of the yoke portion, whereas the radially inner protrusion and the radially outer recess are juxtaposed to each other in the radial direction at the other end of the yoke portion. A pair consisting of the radially outer protrusion and the radially inner recess and a pair consisting of the radially inner protrusion and the radially outer recess can be reversed from the illustrated ones. However, as illustrated, when the first-level core segment has the radially inner protrusion on the right side and the radially outer protrusion on the left side, the second-level core segment has the radially inner protrusion and the radially outer protrusion in laterally inverted relation with those of the first-level core segment; specifically, the second-level core segment has the radially outer protrusion on the right side and the radially inner protrusion on the left side.

The thus-configured first- and second-level core segments are united, thereby configuring a single core block as shown in FIG. 3E. Each of such core segments of a core block can assume the form of a solid body. However, usually, as is well known, a core segment is formed by laminating steel sheets. More specifically, blanks of a predetermined shape are stamped from a steel sheet by use of a press machine and are then laminated within a die. Within the die, press fitting portions (three in the illustrated example) of the laminated blanks or steel sheets are press-fitted for fixation. Press fitting is performed as follows. As shown in FIG. 3F, holes are formed only in the bottom steel sheet simultaneously with stamping. Half-stamped press fitting portions, each of which assumes the form of a protrusion having half the thickness of a steel sheet, are formed in all steel sheets to be laminated on the bottom steel sheet. Then, within the die, the half-stamped press fitting portions are positioned sheet by sheet in the course of lamination, followed by press fitting for fixation. Thus, when a laminate of steel sheets is taken out from the die, the laminate exhibits the form of a unitary core block as shown in FIG. 3E. Alternatively, after the first-level core segment and the second-level core segment are separately configured as shown in FIGS. 3A and 3C, the first- and second-level core segments may be united by means of, for example, press fitting, bonding, or welding. In the case where the first-level core segment and the second-level core segment have the same number of steel sheet laminations, the first-level core segment and the second-level core segment are identical with each other and are merely disposed in inverted relation with each other, thereby providing the advantage of manufacture of core segments of a single type. In this manner, the core block is composed of asymmetric core segments staked in multiple layers. In stacking the core segments, in order to establish the close fit of engaging portions of core blocks to be engaged with each other, the first-level core segment and the second-level core segment are arranged such that the radially inner and outer protrusions of the first-level core segment are in radially reversed relation with those of the second-level core segment.

As is well known, the thus-configured core blocks undergo insulation treatment, such as coating or attachment of insulators, and then undergo winding. After winding, as will be described in detail later, adjacent core blocks can be connected together through mere mechanical fit working, such as application of pressure in the radial direction or the circumferential direction or relative twisting. Thus, the annularly assembled core blocks can retain their annular condition without need of another joining process, such as bonding, welding, or crimping. Subsequently, an annular assembly of the core blocks is assembled into the casing (see FIG. 1).

Figure 4:
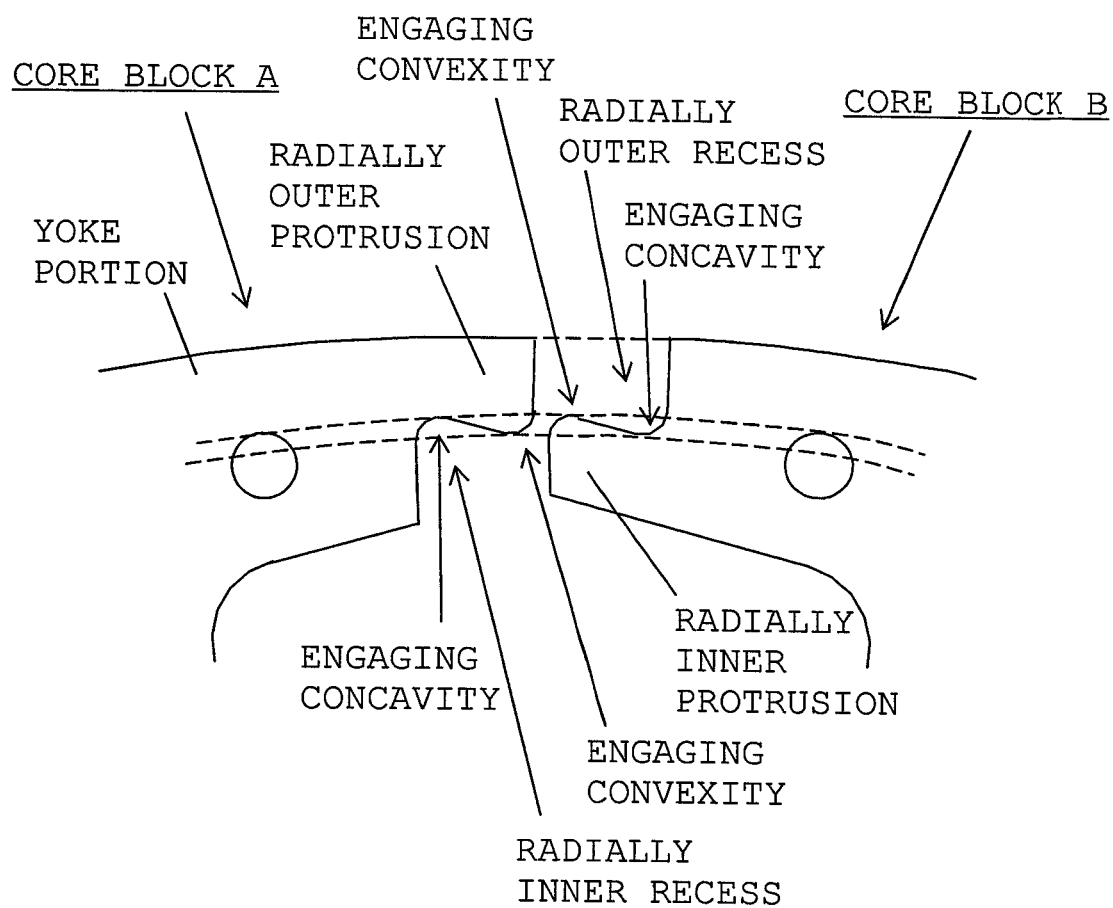
FIG. 4 is a view for explaining how adjacent core blocks are fixedly engaged.

FIG. 4 is a view for explaining how adjacent core blocks are fixedly engaged. As shown in FIG. 4, the radially outer protrusion of core block A is formed such that a radially outer part of the yoke portion of a core segment protrudes in the circumferential direction. In association with the formation of the radially outer protrusion, a radially inner recess is formed on the radially inner side of the radially outer protrusion. The radially outer protrusion has an engaging convexity formed through radially inward protrusion of a distal end portion of the radially outer protrusion. As a result of formation of the engaging convexity, an engaging concavity is formed on a side toward a root portion of the radially outer protrusion. In other words, the radially outer protrusion is configured such that its distal end portion is greater in radial length (thickness) than its root portion. The radially inner protrusion of core block B is formed such that a radially inner part of the yoke portion of a core segment protrudes in the circumferential direction. In association with the formation of the radially inner protrusion, a radially outer recess is formed on the radially outer side of the radially inner protrusion. The radially inner protrusion has an engaging convexity formed through radially outward protrusion of a distal end portion of the radially inner protrusion. As a result of formation of the engaging convexity, an engaging concavity is formed on a side toward a root portion of the radially inner protrusion. In other words, the radially inner protrusion is configured such that its distal end portion is greater in radial length (thickness) than its root portion. Thus, when the adjacent core blocks A and B are engaged, the engaging convexity of the core block A is fitted into the engaging concavity of the core block B, whereas the engaging convexity of the core block B is fitted into the engaging concavity of the core block A. The engaging surfaces of the engaging convexity and the engaging concavity serve as latch surfaces, thereby establishing the fixation of engagement. Thus, the engaged core blocks A and B cannot be easily separated from each other in the circumferential direction.

Figure 5A:
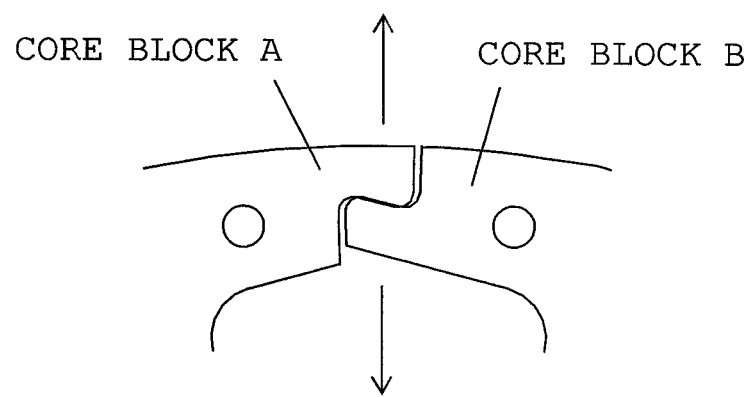
Figure 5B:
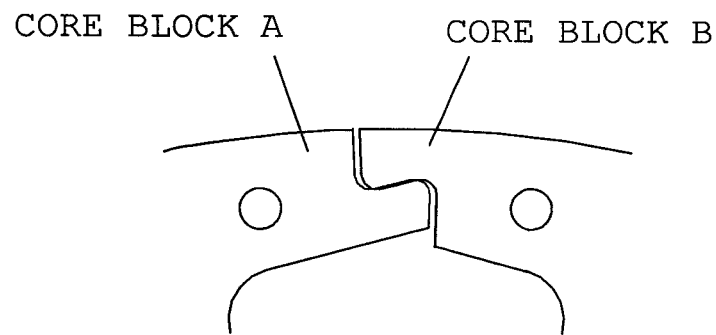
Figure 6A:
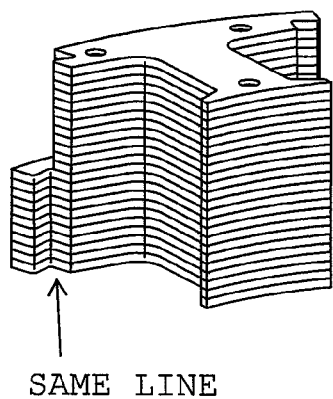
FIGS. 6A to 6D are perspective views of a single core block of a stator core according to a second embodiment of the present invention as viewed from different directions.
Figure 6B:
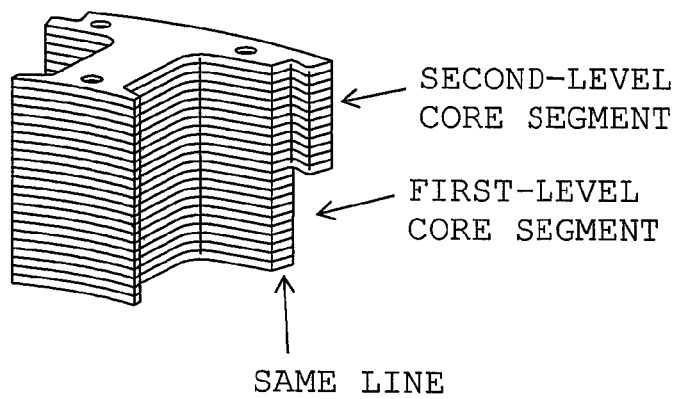
Figure 6C:
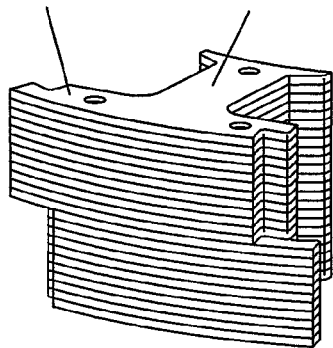
Figure 6D:
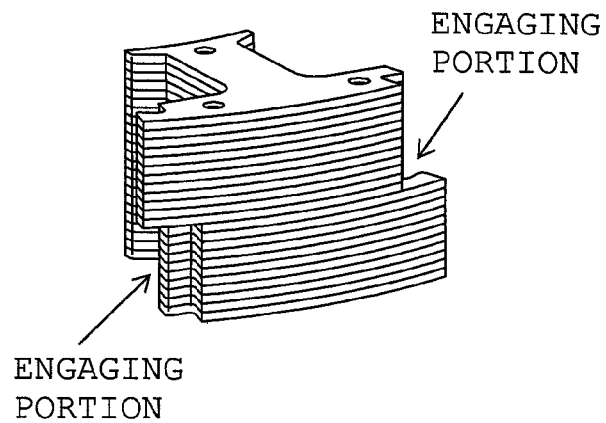

FIGS. 5A and 5B are views showing a state in which adjacent core blocks are engaged. FIG. 5A is a view for explaining the engagement of the second-level core segments. FIG. 5B is a view for explaining the engagement of the first-level core segments. As mentioned previously, the first-level core segment and the second-level core segment can be arranged in reverse relation with the illustrated ones. If only the second-level core segments are present, as illustrated by the arrows in FIG. 5A, the core block A can move radially outward, and the core block B can move radially inward. However, in actuality, the first-level core segments are united with the respective second-level core segments. Accordingly, the radially outward movement of the core block A and the radially inward movement of the core block B are restricted by the latch surface of the engaging portion of the first-level core segment of the core block B and the latch surface of the engaging portion of the first-level core segment of the core block A, respectively. That is, when the core blocks are engaged, the radial movement of the core blocks is restricted.

Also, such movements of two engaged core blocks as to separate the core blocks from each other in the circumferential direction are restricted mutually by the engaging convexities of the core blocks. As mentioned above, when core blocks are united, the radial movement of the core blocks is restricted; thus, the engaged core blocks cannot be separated from each other in the radial direction. In assembly of core blocks, core blocks to be engaged are subjected to circumferential pressure, whereby the engaging portions of the core blocks are forcibly fitted to each other through utilization of elastic deformation of the core blocks. Upon completion of assembly of all core blocks, the movement of the core blocks is restricted in the axial direction, the radial direction, and the circumferential direction by virtue of the latch surfaces formed by the protrusions and recesses provided at the opposite ends of the yoke portions.

FIGS. 6A to 6D are views showing a core block of a stator core according to a second embodiment of the present invention. FIGS. 6A to 6D are perspective views of a single core block as viewed from different directions. Similar to the above-described first embodiment, the stator core is an assembly of 12 core blocks (12 poles) of the same shape. Each of the core blocks is configured such that core segments are stacked in two levels in the axial direction of the rotative shaft. Also, similar to the first embodiment, the core blocks are assembled annularly via engaging portions formed at the opposite ends of the individual core blocks. The engaging portions differ in configuration from those of the first embodiment.

Figure 7A:
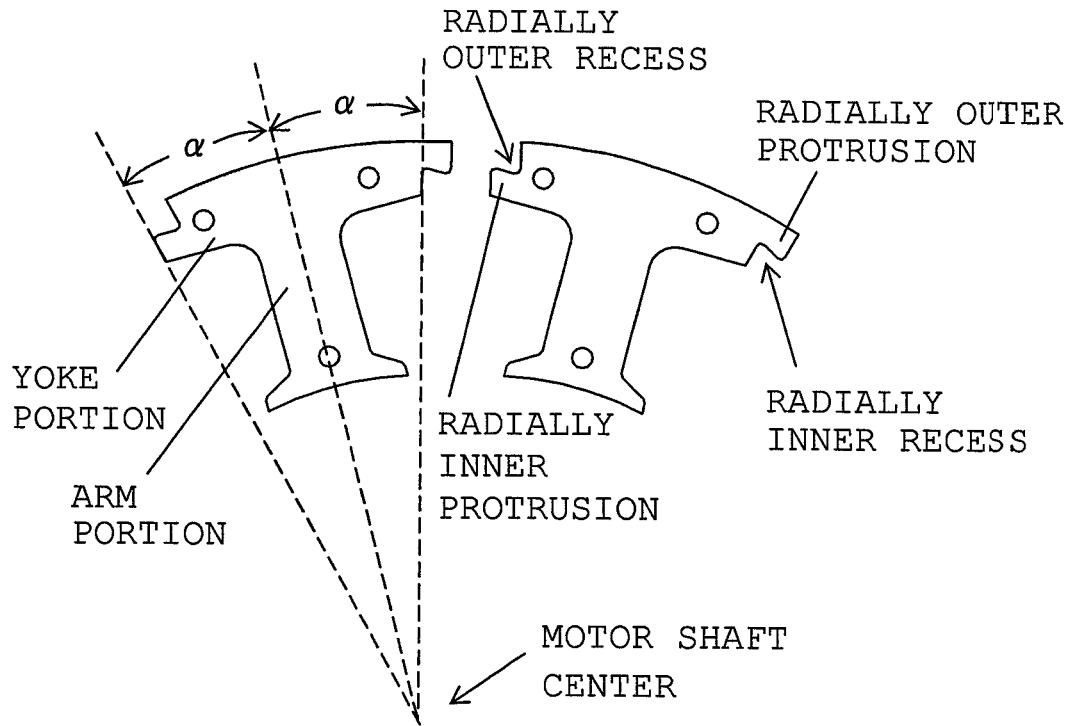
Figure 7B:
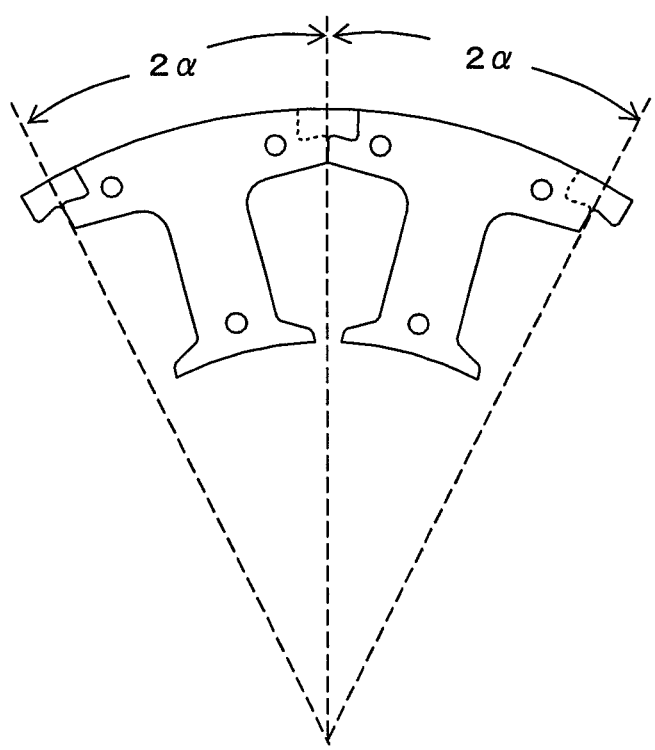

FIGS. 7A and 7B are views for explaining the shape of the engaging portions of the stator core of the second embodiment. FIG. 7A is a view showing the planar shape of a second-level core segment. FIG. 7B is a view showing the planar shape of core blocks engaged together. Similar to the first embodiment, the planar shape of a first-level core segment is asymmetric, and the first-level core segment and the second-level core segment are identical with each other and are merely disposed in laterally inverted relation with each other. Similar to the first embodiment, a radially outer protrusion, a radially inner protrusion, a radially outer recess, and a radially inner recess constitute the engaging portions adapted to fixedly connect core blocks. The radially outer protrusion and the radially inner protrusion of one core block are engaged with the radially outer recess of an adjacent core block and the radially inner recess of another adjacent core block, respectively. The radially outer protrusion and the radially inner recess are juxtaposed to each other in the radial direction at one end of the yoke portion, whereas the radially inner protrusion and the radially outer recess are juxtaposed to each other in the radial direction at the other end of the yoke portion. A pair consisting of the radially outer protrusion and the radially inner recess and a pair consisting of the radially inner protrusion and the radially outer recess can be reversed from the illustrated ones. The details of the protrusions and recesses can be similar to those of the first embodiment which have been described with reference to FIG. 4. Adjacent core blocks engaged via the engaging portions cannot be easily separated from each other in the circumferential direction.

In the stator core shown in FIGS. 7A and 7B, the radially inner, circumferential ends of the yoke portion are on the left and right lines which form, with the common center line, respective center angles of the same value ($\alpha$). When the planar shape shown in FIG. 7A is of the second-level core segment, the planar shape of the first-level core segment is in laterally inverted relation with that of the second-level core segment. Even in this first-level core segment, the radially inner, circumferential ends of the yoke portion are on the left and right lines which form, with the common center line, respective center angles of the same value ($\alpha$). When two core blocks each composed of the first-level core segment and the second-level core segment are engaged as shown in FIG. 7B, the radial latch surfaces between the radially inner protrusions and the radially inner recesses are aligned on the same line. That is, the first-level core segment and the second-level core segment have respective surfaces which are aligned with each other or located in a common plane. Thus, in assembly of core blocks, in addition to the above-mentioned engaging method of the first embodiment in which circumferential pressure is applied to core blocks to be engaged so as to forcibly fit the core blocks to each other, the present second embodiment also enables the engagement of two core blocks through relative twisting. Specifically, in the case of core blocks of a two-level configuration, two core blocks to be engaged are arranged as follows: the protrusion of an engaging portion of one core block is located radially outward (e.g., on the circumferentially right side) at the first-level core segment, whereas the protrusion of an engaging portion of the other core block is located radially outward (e.g., on the circumferentially left side) at the second-level core. In this condition, the core blocks are relatively twisted so as to cause the engaging portions to butt against each other, thereby assembling the core blocks together. For engagement of each of the two core blocks with another core block on the circumferentially opposite side, each of the two core blocks must be twisted in a direction opposite the direction in which the core block has been twisted for engagement of the two core blocks. Accordingly, when all core blocks are assembled together, the movement of the core blocks is restricted bidirectionally with respect to the axial direction, the radial direction, and the circumferential direction.

Figure 8A:
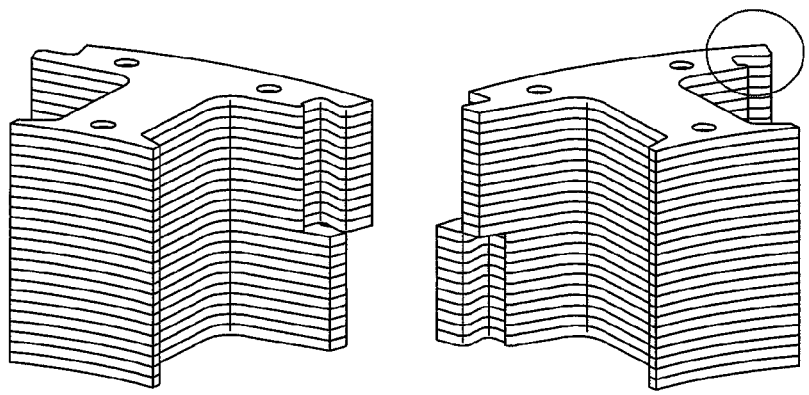
FIG. 8A is a perspective view showing a single core block of a stator core according to a third embodiment of the present invention as viewed from different directions.
Figure 8B:
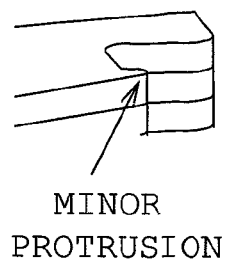
FIG. 8B is an enlarged view of the circled area of FIG. 8A.
Figure 8C:
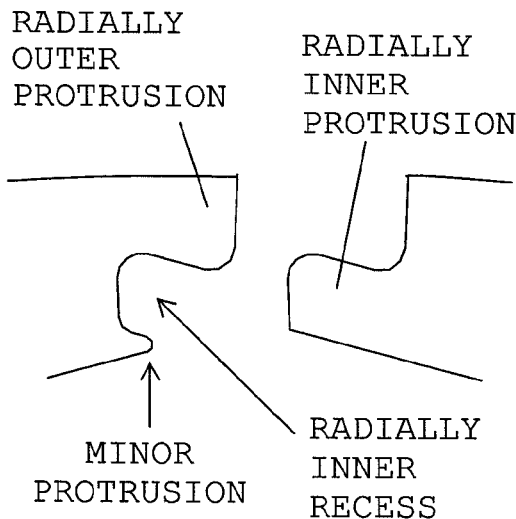
FIGS. 8C and 8D are views showing engaging portions of second-level core segments and engaging portions of first-level core segments, respectively, as viewed before engagement.
Figure 8D:
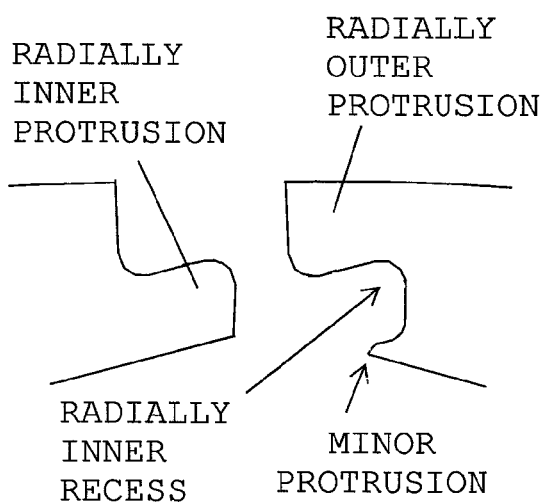
Figure 8E:
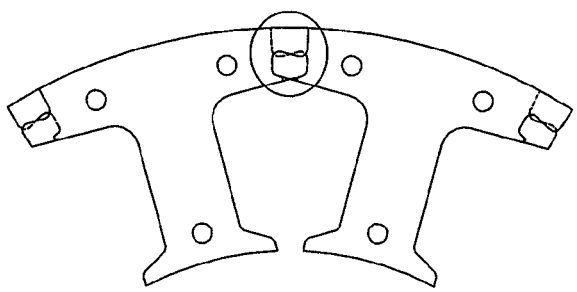
FIG. 8E is a plan view showing engaged core blocks.
Figure 8F:
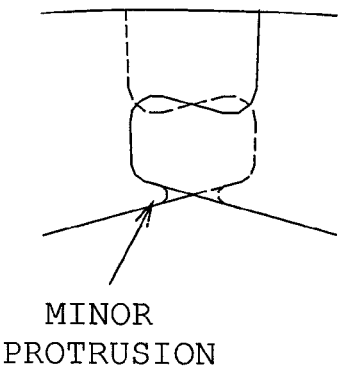
FIG. 8F is an enlarged view showing the circled area of FIG. 8E.

FIGS. 8A to 8E are views showing a core block of a stator core according to a third embodiment of the present invention. FIG. 8A is a view showing a single core block as viewed from different directions; FIG. 8B is an enlarged view of the circled area of FIG. 8A; FIGS. 8C and 8D are views showing engaging portions of second-level core segments and engaging portions of first-level core segments, respectively, as viewed before engagement; FIG. 8E is a plan view showing engaged core blocks; and FIG. 8F is an enlarged view showing the circled area of FIG. 8E. The illustrated stator core is similar to that of the first embodiment described above except for a minor protrusion provided on a radially inner side.

Similar to the first embodiment, a radially outer protrusion and a radially outer recess to be engaged together and a radially inner protrusion and a radially inner recess to be engaged together constitute respective engaging portions adapted to fixedly connect core blocks. In the present third embodiment, a minor protrusion is formed on the radially inner side of the radially inner recess. As shown in FIGS. 8E and 8F, when adjacent core blocks are engaged, the radially inner protrusion of another core block fitted into the radially inner recess of one core block is restricted in its movement in such a manner as to be held between the radially outer protrusion of the one core block located radially outward of the radially inner protrusion and the minor protrusion of the one core block located radially inward of the radially inner protrusion.

Figure 9:
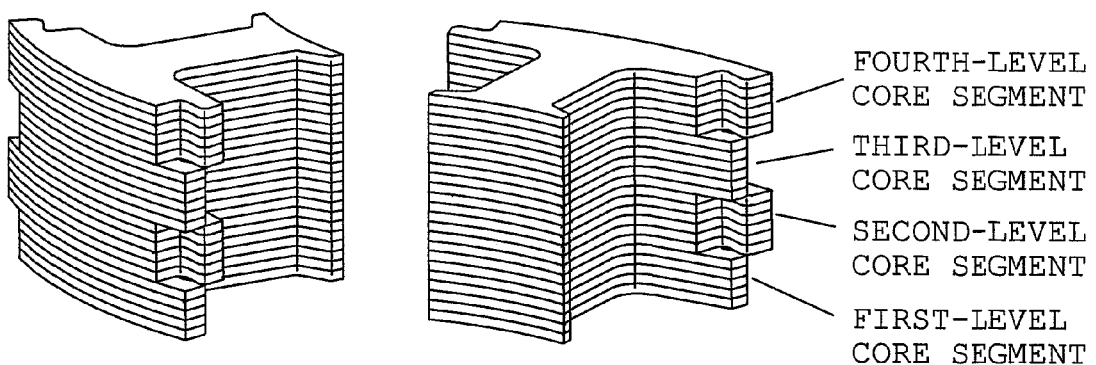
FIG. 9 is a perspective view of a single core block of a stator core according to a forth embodiment of the present invention as viewed from different directions.

FIG. 9 is a perspective view of a single core block of a stator core according to a forth embodiment of the present invention as viewed from different directions. In the stator core of the present fourth embodiment, a core block is composed of four asymmetric core segments stacked in four levels. Each of a pair consisting of the illustrated first- and second-level core segments and a pair consisting of the illustrated third- and fourth-level core segments corresponds to the core block of the first embodiment shown in FIG. 2 except for the number of steel sheet laminations. In other words, the core block of the fourth embodiment shown in FIG. 9 corresponds to two core blocks of the first embodiment stacked in two levels. Such stacking of core segments in multiple levels establishes firmer engagement of adjacent core blocks. In this manner, the present invention can be embodied such that core segments are stacked in two or more levels.

Figure 10:
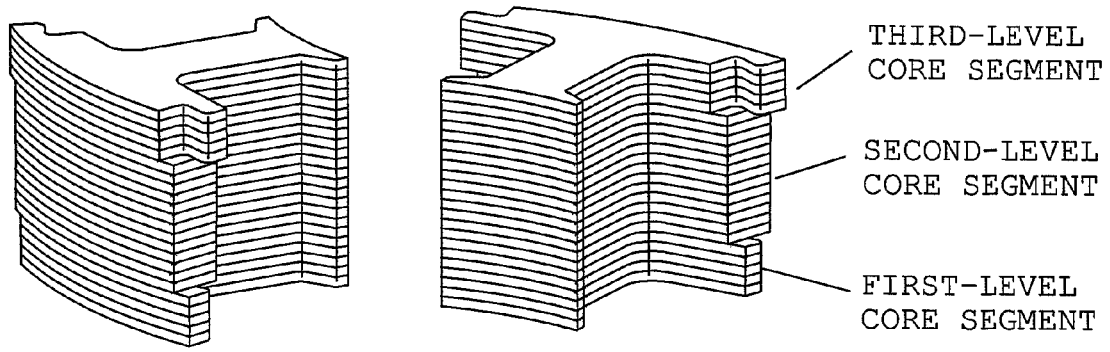
FIG. 10 is a perspective view of a single core block of a stator core according to a fifth embodiment of the present invention as viewed from different directions.

FIG. 10 is a perspective view of a single core block of a stator core according to a fifth embodiment of the present invention as viewed from different directions. In the stator core, a core block is composed of three core segments stacked in three levels such that a symmetric core segment is sandwiched between asymmetric core segments. The illustrated second-level core segment does not have the above-mentioned engaging portions. Adjacent second-level core segments are connected in such a manner that the facing circumferential ends of their yoke portions are in contact with each other. A force of connecting the second-level core segments is provided by the engaging portions of the first-level core segments and the third-level core segments, which are located under and above the second-level core segments, respectively. The first-level core segment and the third-level core segment shown in FIG. 10 correspond to the first-level core segment and the second-level core segment, respectively, of the first embodiment shown in FIG. 2 except for the number of steel sheet laminations.

Figure 11:
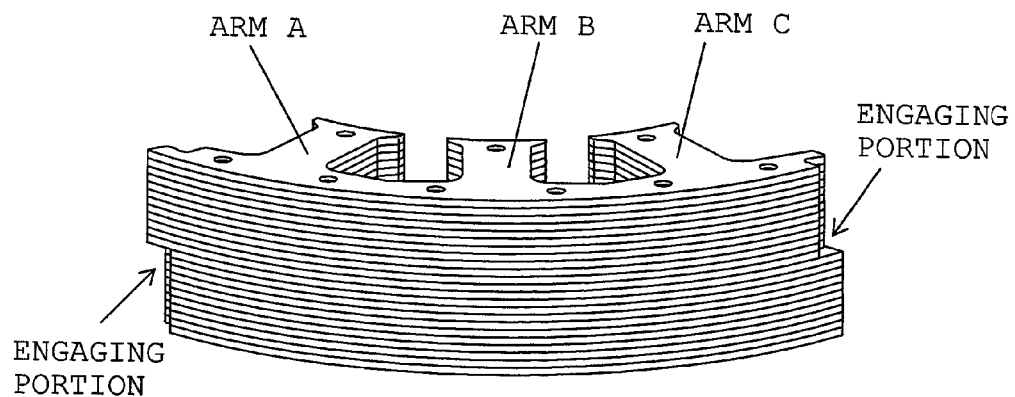
FIG. 11 is a perspective view of a single core block of a stator core according to a sixth embodiment of the present invention.

FIG. 11 is a perspective view of a single core block of a stator core according to a sixth embodiment of the present invention. In the stator core, a single core block is configured such that three arm portions A to C are formed integral with a single arcuate yoke portion. In formation of, for example, the annular stator core (12 poles) shown in FIG. 2A, four core blocks (each having 3 poles) shown in FIG. 11 are connected. Engaging portions are provided at opposite ends of the yoke portion integrated with the three arm portions A to C. In the case where particular difficulty is not encountered in winding work as in winding of a thin wire, use of core blocks of the illustrated configuration is advantageous from the viewpoint of improvement of utilization of core material and a reduction in the number of man-hours required for engagement of core blocks. The present embodiment has been described while mentioning a core block configured such that three arm portions (3 poles) are integrated with a single yoke portion. However, in the present invention, no particular limitation is imposed on the number of arm portions. Any number of arm portions can be integrated with a yoke portion to configure a single core block.

Figure 12A:
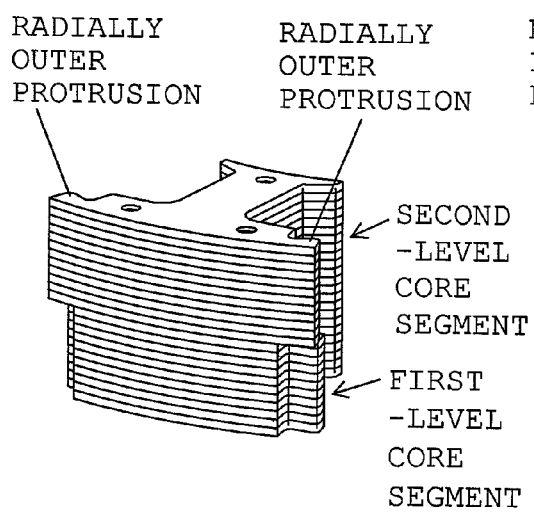
Figure 12B:
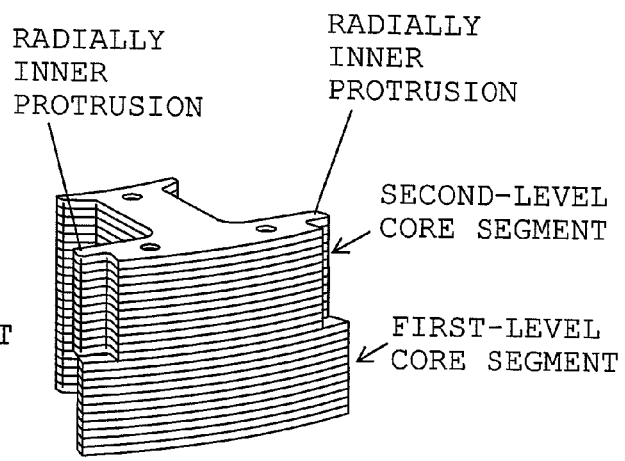

FIGS. 12A and 12B are views showing core blocks of different types of a stator core according to a seventh embodiment of the present invention. FIGS. 12A and 12B are perspective views showing a core block of type A and a core block of type B, respectively. Both core blocks of type A and type B are symmetric. In the core block of type A, the second-level core segment has radially outer protrusions protruding from circumferentially opposite sides thereof, and the first-level core segment has radially inner protrusions protruding from circumferentially opposite sides thereof. The core block of type B is in reverse relation with that of type A; specifically, the first-level core segment has radially outer protrusions protruding from circumferentially opposite sides thereof, whereas the second-level core segment has radially inner protrusions protruding from circumferentially opposite sides thereof. Needless to say, the protrusions are accompanied by respective recesses. Similar to the above-described embodiments, the first-level core segment and the second-level core segment can be reversed in shape. In the case where the first-level core segment and the second-level core segment have the same number of laminated core sheets, type A and type B are identical with each other and are merely disposed in vertically inverted relation with each other. Core blocks of type A and type B are arranged alternatingly in the circumferential direction and engaged with one another, whereby the core blocks can be engaged annularly. Accordingly, the present embodiment can also yield effects similar to those yielded by the aforementioned embodiments.

Figure 13A:
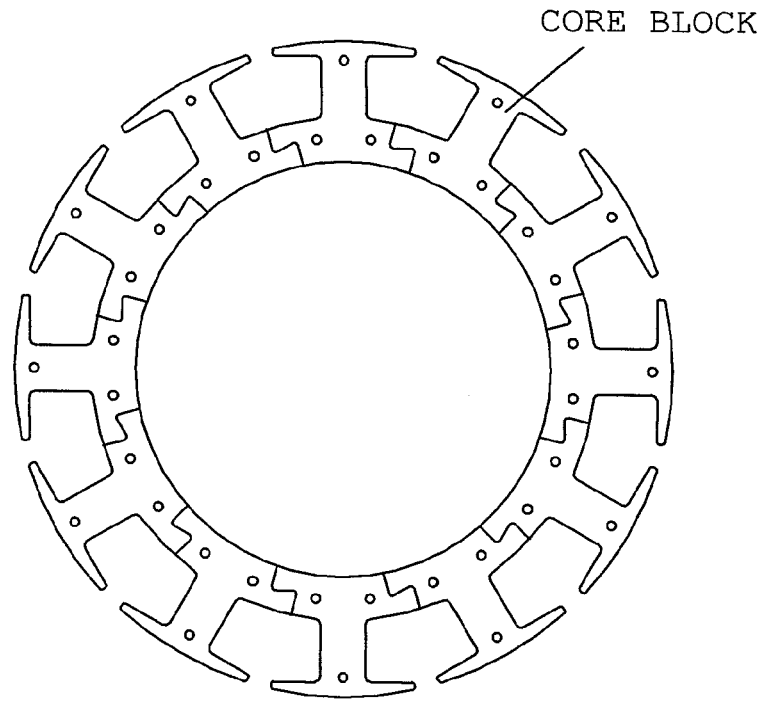
FIG. 13A is a plan view showing a stator core of a split configuration according to an eighth embodiment of the present invention capable of being used in an outer-rotor brushless DC motor and showing a state in which core blocks are assembled into an annular shape.
Figure 13B:
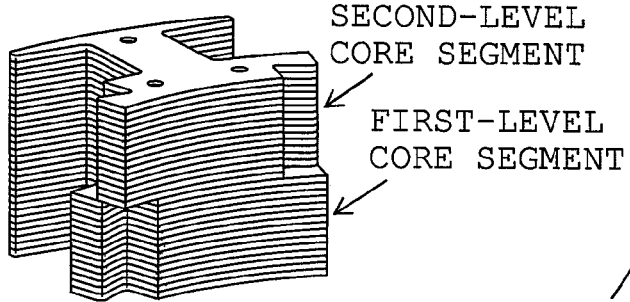
FIGS. 13B to 13E are perspective views showing a single core block as viewed from different directions.
Figure 13C:
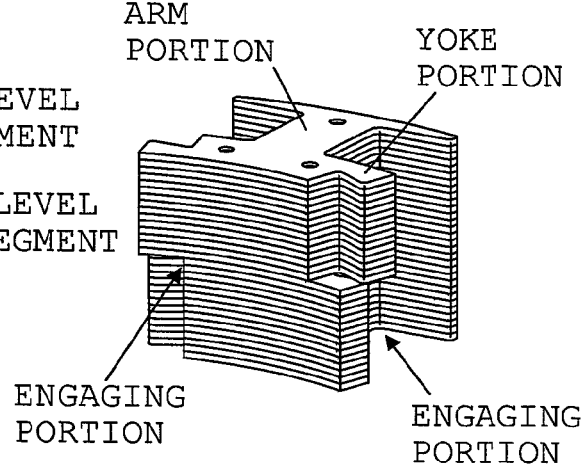
Figure 13D:
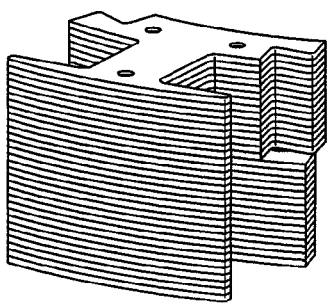
Figure 13E:
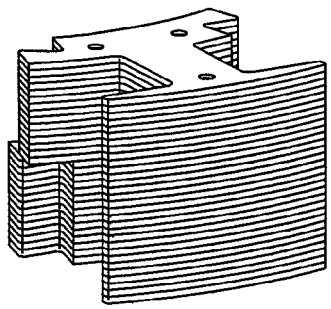

FIGS. 13A to 13E are views showing a stator core of a split configuration according to an eighth embodiment of the present invention capable of being used in an outer-rotor brushless DC motor. FIG. 13A is a plan view showing a state in which core blocks are assembled into an annular shape. FIGS. 13B to 13E are perspective views showing a single core block as viewed from different directions. The illustrated stator core is an assembly of 12 core blocks (12 poles) of the same shape. Each of the core blocks is configured such that core segments are stacked in two levels in the axial direction of the rotative shaft. In this manner, the core block configuration shown in FIGS. 13A to 13E is similar to that of the first embodiment described above. Similar to the first embodiment, each of the core blocks has an arm portion, on which winding is wound, and a yoke portion extending bidirectionally along the circumferential direction from the arm portion. However, each of the core blocks differs from that of the first embodiment in that the yoke portion extends in the circumferential direction at a radially inner end of the arm portion. The yoke portion has engaging portions at circumferentially opposite ends thereof for engagement with adjacent core blocks. The present embodiment has been described while mentioning a core block similar to that of the first embodiment described above. However, similarly, the core blocks of the second to seventh embodiments described above can also be transformed or modified for application to a stator core of an outer-rotor brushless DC motor.

Next, application of a split configuration to the rotor core shown in FIG. 1 will be described. FIG. 14 is a perspective view showing a state in which the rotor core of a split configuration is mounted on the rotative shaft. FIG. 15A is a perspective view showing the entire rotor core. FIGS. 15B to 15E are perspective views showing a single core block as viewed from different directions. Winding is not wound on the rotor core, and, as shown in FIG. 14, an annular magnet is externally fitted to the rotor core. The illustrated rotor core is an assembly of eight core blocks of the same shape. Each of the core blocks is configured such that core segments are stacked in two levels in the axial direction of the rotative shaft. In this manner, the core block configuration shown in FIGS. 14 and 15A to 15E is similar to that of the stator core of the first embodiment. Similar to the first embodiment, each of the core blocks has an arm portion (on which winding is not wound), and a yoke portion extending bidirectionally along the circumferential direction at a radially outer end of the arm portion. The yoke portion has engaging portions at circumferentially opposite ends thereof for engagement with adjacent core blocks. The present embodiment has been described while mentioning a core block similar to that of the first embodiment described above. However, similarly, the core blocks of the second to seventh embodiments described above can also be transformed or modified for application to a rotor core.

Next, application of the present invention to the stator core of an axial-gap-type brushless motor will be described. FIG. 16A is a perspective view showing the entire stator core. FIGS. 16B to 16E are perspective views showing a single core block as viewed from different directions. The illustrated core block is formed from a compact of a magnetic material powder instead of steel sheet laminations. Although unillustrated, winding is wound on an arm portion. A rotor magnet is disposed above the core block shown in FIG. 16A in such a manner as to face the core block with a gap provided therebetween in the axial direction of a rotative shaft. This configuration is a known one.

The illustrated stator core is an assembly of 12 core blocks (12 poles) of the same shape. Similar to the first embodiment described above, each of the core blocks has an arm portion, on which winding is wound, and a yoke portion extending bidirectionally along the circumferential direction from the arm portion. However, each of the core blocks differs from that of the first embodiment in that the yoke portion extends bidirectionally in the circumferential direction at one of opposite ends of the arm portion located in the axial direction of the rotative shaft (on a side opposite a side on which the arm portion faces the rotor magnet). The yoke portion differs from that of the first embodiment in that core segments are stacked in two levels in the radial direction, since, in the first embodiment, core segments are stacked in two levels in the axial direction of the rotative shaft. However, similar to the first embodiment, the yoke portion has engaging portions at circumferentially opposite ends thereof for engagement with adjacent core blocks. However, a protrusion and a recess which constitute the engaging portion differ from those of the first embodiment in that the protrusion and the recess are juxtaposed to each other in the axial direction of the rotative shaft, since those of the first embodiment are juxtaposed to each other in the radial direction. The present embodiment has been described while mentioning a core block similar to that of the first embodiment described above. However, similarly, the core blocks of the second to seventh embodiments described above can also be transformed or modified for application to a stator core of an axial-gap-type brushless motor.

Similar to the above-mentioned outer-rotor-type motor, winding work for the axial-gap-type motor is facilitated through employment of a split core.

Figure 17A:
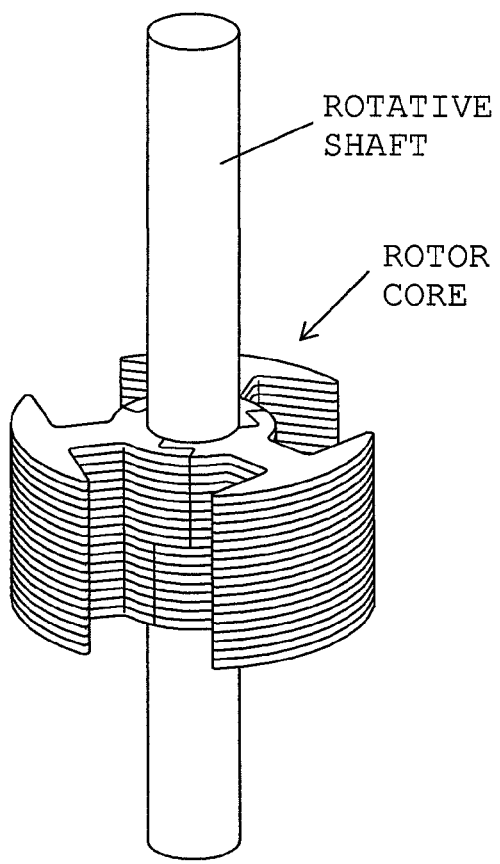
FIG. 17A is a perspective view showing a state in which a rotor core is mounted on a rotative shaft.
Figure 17B:
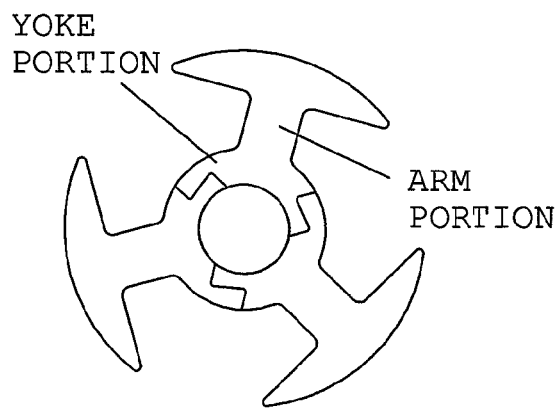
FIGS. 17B and 17C are a top view and a perspective view, respectively, showing the rotor core of FIG. 17A in an assembled state.
Figure 17C:
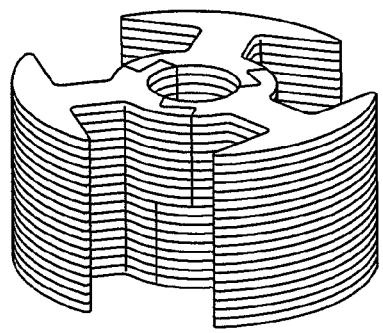
Figure 17D:
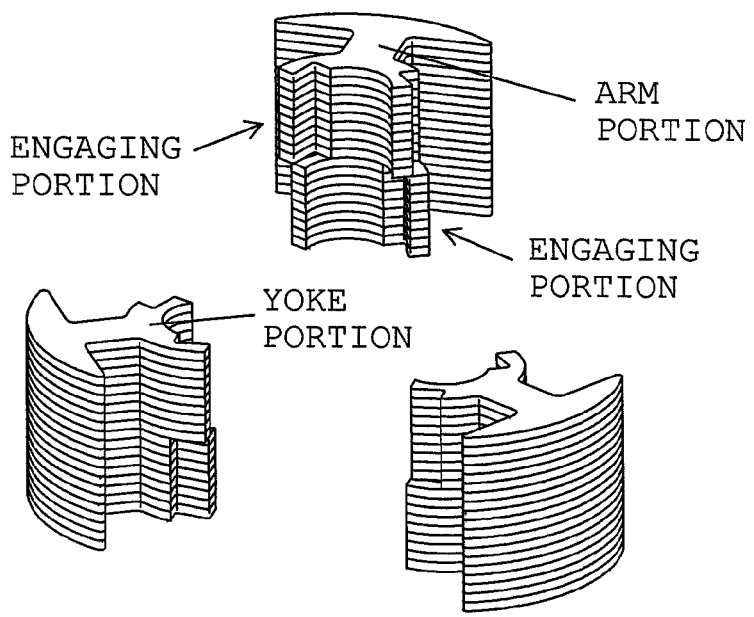
FIG. 17D is a perspective view showing core blocks of the rotor core of FIG. 17A as viewed before assembly.
Figure 18A:
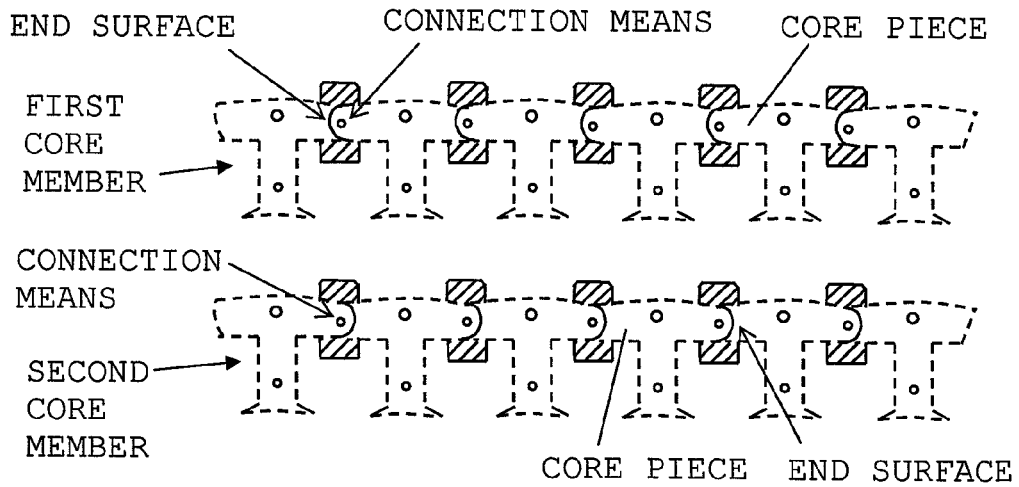
FIG. 18A is a plan view showing a step of forming, by a stamping process, core members of a conventional stator core of an articulated structure described in Japanese Patent Application Laid-Open (kokai) No. 2000-201458.
Figure 18B:
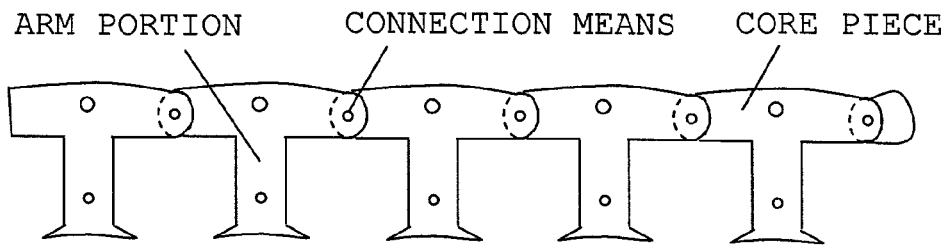
FIG. 18B is a plan view showing a state in which the core members of FIG. 18A are laminated.
Figure 19:
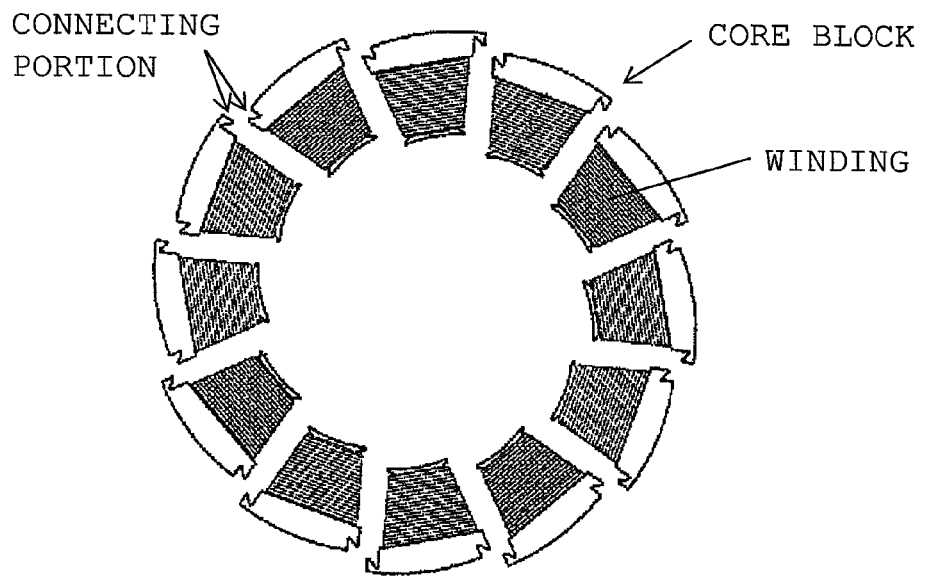
FIG. 19 is a view showing how core blocks of a split core disclosed in Japanese Patent Application Laid-Open (kokai) No. 2006-304495 are connected to one another in a fixed condition.

Next, application of the present invention to a rotor core of a DC motor having brushes will be described. FIG. 17A is a perspective view showing a state in which a rotor core is mounted on a rotative shaft. FIGS. 17B and 17C are a top view and a perspective view, respectively, showing the rotor core in an assembled state. FIG. 17D is a perspective view showing core blocks as viewed before assembly. Although unillustrated, winding is wound on the core blocks. The illustrated rotor core is an assembly of three core blocks (3 poles) of the same shape. Each of the core blocks is configured such that core segments are stacked in two levels in the axial direction of the rotative shaft. In this manner, the core block configuration shown in FIGS. 17A to 17D is similar to that of the first embodiment described above. Similar to the first embodiment, each of the core blocks has an arm portion on which winding is wound, and a yoke portion extending bidirectionally along the circumferential direction from the arm portion. However, each of the core blocks differs from that of the first embodiment in that the yoke portion extends bidirectionally in the circumferential direction at a radially inner end of the arm portion. The yoke portion has engaging portions at circumferentially opposite ends thereof for engagement with adjacent core blocks. The present embodiment has been described while mentioning a core block similar to that of the first embodiment described above. However, similarly, the core blocks of the second to seventh embodiments described above can also be transformed or modified for application to a rotor core of a DC motor having brushes.

While the core block of the present invention has been described with reference to the above-described embodiments, the present invention is not limited thereto. For example, the present invention can be applied to a stator core of a permanent-magnet-type stepping motor having a configuration similar to that of an inner-rotor-type brushless motor, a stator core and a rotor core of a variable-reluctance-type stepping motor, a stator core of a hybrid-type stepping motor, a stator core of an induction motor, a stator core of a universal motor, and a rotor core of a universal motor having a configuration similar to the basic structure of a core of a DC motor. Accordingly, all such modifications are intended to be included within the scope of this invention.

What is claimed is:

1. A magnetic pole core for a motor, comprising:
a plurality of core blocks united annularly, wherein each of the core blocks has an arm portion, and a yoke portion extending in a circumferential direction at an end of the arm portion, and at least the yoke portion is configured such that a plurality of core segments are stacked in multiple levels in an axial direction of a rotative shaft of the motor or in a radial direction, each of the core blocks having engaging portions formed at respective opposite ends of the yoke portion and adapted to connect the core block to adjacent core blocks, wherein in at least one of the core segments stacked in multiple levels, each of the engaging portions has a protrusion extending in the circumferential direction from a corresponding one of the opposite ends of the yoke portion, and a recess juxtaposed to the protrusion in the radial direction or the axial direction and adapted to receive the protrusion of an adjacent core block, and, in at least another one of the core segments stacked in multiple levels, each of the engaging portions has the protrusion and the recess provided in positionally reversed relation with those of the one of the core segments with respect to the radial direction or the axial direction, wherein each of the protrusions extending in the circumferential direction from the yoke portion has an engaging convexity which is formed at a distal end portion of the protrusion through increase in thickness of the distal end portion as compared with a root portion of the protrusion, thereby forming, on a side toward the root portion, an engaging concavity with which the engaging convexity of an adjacent core block is engaged.

2. A magnetic pole core for a motor, comprising:
a plurality of core blocks united annularly, wherein each of the core blocks is configured such that a plurality of unit core blocks are connected in a circumferential direction of said core blocks, each of the unit core blocks having an arm portion, and a yoke portion extending in the circumferential direction at an end of the arm portion, and at least the yoke portion is configured such that a plurality of core segments are stacked in multiple levels in an axial direction of a rotative shaft of the motor or in a radial direction, each of the core blocks having engaging portions formed at respective outer ends of the yoke portions located at opposite sides of the core block and adapted to connect the core block to adjacent core blocks, wherein in at least one of the core segments stacked in multiple levels, each of the engaging portions has a protrusion extending in the circumferential direction from a corresponding one of the outer ends of the yoke portions, and a recess juxtaposed to the protrusion in the radial direction or the axial direction and adapted to receive the protrusion of an adjacent core block, and, in at least another one of the core segments stacked in multiple levels, each of the engaging portions has the protrusion and the recess provided in positionally reversed relation with those of the one of the core segments with respect to the radial direction or the axial direction, wherein each of the protrusions has an engaging convexity which is formed at a distal end portion of the protrusion through increase in thickness of the distal end portion as compared with a root portion of the protrusion, thereby forming, on a side toward the root portion, an engaging concavity with which the engaging convexity of an adjacent core block is engaged.

* * * * *